UNITED STATES PATENT OFFICE.

ALFRED WOLF, OF PARIS, FRANCE.

COMPOUND FOR PROTECTING AND INDURATING POROUS MATERIALS.

SPECIFICATION forming part of Letters Patent No. 692,961, dated February 11, 1902.

Application filed August 15, 1901. Serial No. 72,281. (No specimens.)

*To all whom it may concern:*

Be it known that I, ALFRED WOLF, manufacturer, a citizen of the Republic of France, residing at 33 Rue Amelot, Paris, Seine, in the Republic of France, have invented certain new and useful Improvements in Compounds for Protecting and Indurating Porous Materials, of which the following is a specification.

The object of this invention is a new product of manufacture to be used for hardening, agglomerating, coating, or decorating different porous materials and manufactured articles.

My improved compound consists of the following ingredients, combined in about the proportions: common rosin, five hundred grams; stearin, five hundred grams; bitumen, preferably jew's pitch, 0.20 grams; benzoin, preferably from Sumatra, 0.5 grams, and creosote, preferably from beech, 0.05 grams. If it is desirable, any coloring-matter can be added. For preparing the product the said substances are taken in above-indicated proportions and heated in a proper receptacle to a complete solution and suitably stirred to produce a homogeneous mixing of composition. The solution thus prepared is poured into and cooled in any mold.

The composition may be used in melted or liquid form as a bath or a coating, the articles to be treated being previously heated, as gradual cooling is very desirable for good work and result. The hardening is obtained by immersing or dipping the articles in the bath for a time, generally five to thirty minutes, depending on the nature, thickness, &c., of the article as well as the degree of hardening desired. If the articles are dipped in the bath a sufficient time, the penetration is as deep as may be desired and the whole porous material may be penetrated by the compound. The articles are then wiped with an absorbent cloth and dried in the air. If the article is not of convenient size, it may be operated frictionally to bring it into handy dimensions or proceeding by spraying or coating with a brush, sponge, or the like. The article is preferably treated and maintained at a suitable temperature to obtain a quick and complete absorption of the coating. The articles worked upon with the composition, as stated hereinabove, are capable of receiving any sort of colors and decoration.

It is obvious that the appliances are the most varied, and this said composition may be used for every product and material which can receive it.

Having now particularly described and ascertained the nature of my said invention and in what manner the same is to be performed, I declare that what I claim is—

1. A compound for penetrating, hardening and protecting porous materials which consists of rosin and stearin combined in about equal parts by weight.

2. A compound for penetrating, hardening and protecting porous materials which consists of rosin and stearin combined in about equal parts by weight with a little addition of bitumen, benzoin and creosote in about the proportions stated.

In witness whereof I have hereunto signed my name, this 2d day of August, 1901, in the presence of two subscribing witnesses.

ALFRED WOLF.

Witnesses:
VICTOR DE MARENDOWSKI,
PAUL FOURNOL.